(12) United States Patent
L'Angevin

(10) Patent No.: US 6,453,618 B1
(45) Date of Patent: Sep. 24, 2002

(54) SELF ADHESIVE STRIP FORMING FOR EXAMPLE A JOINT FOR AUTOMOBILE VEHICLES

(75) Inventor: Bernard L'Angevin, Rennes (FR)

(73) Assignee: Automobiles Citroen, Neuilly sur Siene (FR)

( * ) Notice: Subject to any disclaimer, the term of this patent is extended or adjusted under 35 U.S.C. 154(b) by 0 days.

(21) Appl. No.: 09/531,751

(22) Filed: Mar. 20, 2000

Related U.S. Application Data

(63) Continuation of application No. PCT/FR99/01753, filed on Jul. 16, 1999.

(30) Foreign Application Priority Data

Jul. 21, 1998 (FR) ............................................. 98 09292

(51) Int. Cl.$^7$ ................................................. E06B 7/16
(52) U.S. Cl. ................................................... 49/475.1
(58) Field of Search ............................ 49/475.1, 476.1, 49/495.1, 498.1

(56) References Cited

U.S. PATENT DOCUMENTS

| | | | | |
|---|---|---|---|---|
| 3,893,212 A | | 7/1975 | Curry ............................ | 24/243 |
| 4,267,876 A | | 5/1981 | Bloomfield ................... | 60/392 |
| 5,106,149 A | * | 4/1992 | Glossop et al. ........ | 49/476.1 X |
| 5,356,194 A | * | 10/1994 | Takeuchi ............... | 49/475.1 X |
| 5,527,583 A | * | 6/1996 | Nozaki et al. ......... | 49/475.1 X |
| 5,715,632 A | * | 2/1998 | Nozaki ....................... | 49/475.1 |
| 5,918,421 A | * | 7/1999 | Nozaki ................... | 49/475.1 X |
| 5,939,173 A | | 8/1999 | Voss ............................ | 428/158 |

FOREIGN PATENT DOCUMENTS

| | | |
|---|---|---|
| DE | 36 38 176 | 5/1988 |
| DE | 38 08 443 | 9/1989 |
| DE | 296 13 594 | 11/1996 |

\* cited by examiner

*Primary Examiner*—Jerry Redman
(74) *Attorney, Agent, or Firm*—Pennie & Edmonds LLP

(57) ABSTRACT

A self-adhesive strip, forming a joint for an automobile vehicle, comprises a first self-adhesive face, a second face that is opposed to the first self adhesive face, a rail shaped protrusion formed on the second face and enabling a guiding thereof by a tool for causing a fixation of said strip by pressure.

17 Claims, 2 Drawing Sheets

SELF ADHESIVE STRIP FORMING FOR EXAMPLE A JOINT FOR AUTOMOBILE VEHICLES

CROSS REFERENCE TO RELATED APPLICATIONS

This application is a continuation of International Application PCT/FR99/01753 filed Jul. 16, 1999.

FIELD OF THE INVENTION

The present invention relates essentially to a self-adhesive strip which is for example able to form a rain drop or a water-groove joint for an automobile vehicle.

BACKGROUND OF THE INVENTION

The terms "rain drop joint" or "water groove joint" designate a joint provided to be positioned on the body of a vehicle at the level of the upper part of the door frame and which is used, on the one hand, for preventing water from running along the window pan or entering within the passenger space and, on the other hand, for limiting aerodynamic noises.

Up to now, in the automobile industry in particular, no self-adhesive joints have ever been proposed, and more particularly such adhesive joints that are designed for permitting automatically, by means of a tool, a precise positioning of the joint and the application thereof by pressure on the element which must receive this joint.

PURPOSE AND SUMMARY OF THE INVENTION

The present invention has therefore for its purpose to fill this gap.

It is thus an object of the present invention to provide a self-adhesive strip forming for example a joint for an automobile vehicle, comprising a self-adhesive face and, on a face thereof that is opposed to this self-adhesive face, a rail shaped protrusion permitting its guiding by means of a tool for fixing the strip by pressure.

According to a preferred embodiment, this strip comprises two wings that are articulated together by one of their two longitudinal edges. One of the wings, or a first wing, comprises the above-mentioned self-adhesive face and, on its opposed face, the above-mentioned protrusion which protrudes on the side of the other wing, or second wing.

The above-mentioned rail shaped protrusion can be integral with the first wing through at least one thinned portion of material permitting to separate said protrusion from the first wing after positioning of the strip.

According to still another feature of the strip of the invention, the first wing comprises a free edge with a lip, or a first lip, that is oriented on the side of the self-adhesive face for concealing it and an opposite edge which comprises a heel and is connected to the second wing by means of a hinge that is recessed from said heel.

According to another feature of this invention, the second wing is connected in a substantially orthogonal manner to the first wing by means of the above-mentioned hinge and has an arcuate shape with a concavity that is turned on the side of the face of the first wing that supports the above-mentioned protrusion.

The second wing comprises a cavity and ends by a lip shaped free end.

According to still another feature of the strip of the invention, the free end of the first wing comprises a second lip which extends in front of the second wing, opposite the above-mentioned first lip.

The above-mentioned rail shaped protrusion may have a cross-sectional shape enabling its guiding, and particularly a square shape, a rectangular shape, a triangular shape, or another shape able to cooperate with a tool having a shape that corresponds to said protrusion. This tool may for example be a grooved roller or a hand tool such as a smoothing iron having a notch of a shape corresponding to said protrusion.

The self-adhesive face of the first wing comprises an adhesive coating that is housed in said face and covered with a removable protective tape.

BRIEF DESCRIPTION OF THE DRAWINGS

The features of the present invention which are believed to be novel are set forth with particularity in the appended claims.

The present invention, both as to its organization and manner of operation, together with further objects and advantages thereof, may best be understood with reference to the following description, taken in connection with the accompanying drawings given only as examples and in which :

FIG. 2 is a view similar to FIG. 1 but showing the strip during its mounting and fixation in a rebate, rain-strap or similar.

DESCRIPTION OF THE PREFERRED EMBODIMENT

Figure 1:
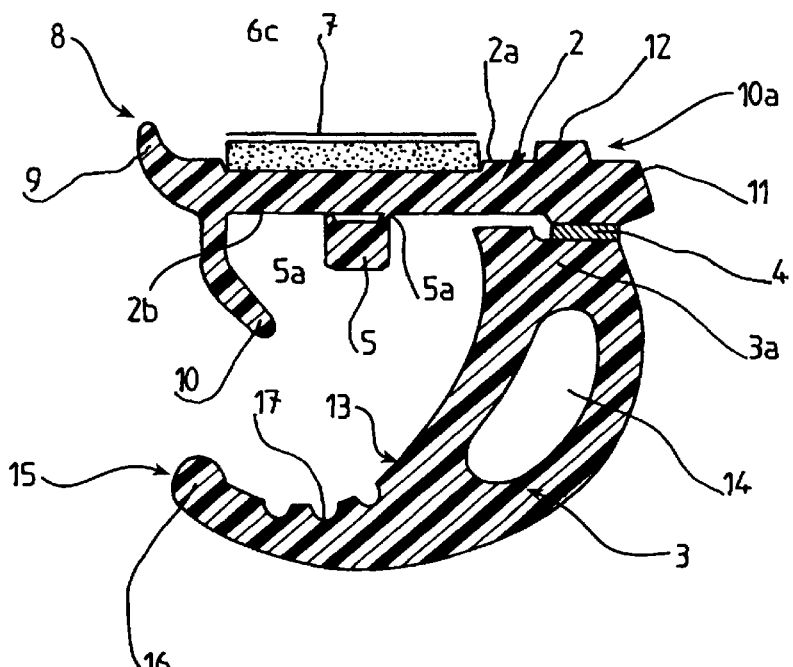
FIG. 1 is a cross-sectional view of a self-adhesive strip according to the invention in a rest position.

Referring now to the drawings and in particular to FIG. 1, the self-adhesive strip according to the invention has roughly, in cross-section, the shape of the letter L, one of the arms of which is curved in the direction of the other arm.

This strip is made of a single unit by molding or extrusion and over-molding of one or a plurality of suitable polymer materials and may have various uses in the automobile industry. For example, the strip may be used as a protecting or sealing element with respect to water, air, dust and noise. This strip can then form a rain drop joint or a water groove joint provided around lateral openings in a body of an automobile vehicle. The strip can be fixed with a recess, as shown at 1.

There is now shown at 2 and 3 respectively the two arms or wings of the strip which are articulated together by means of a hinge forming part 4.

Figure 2:
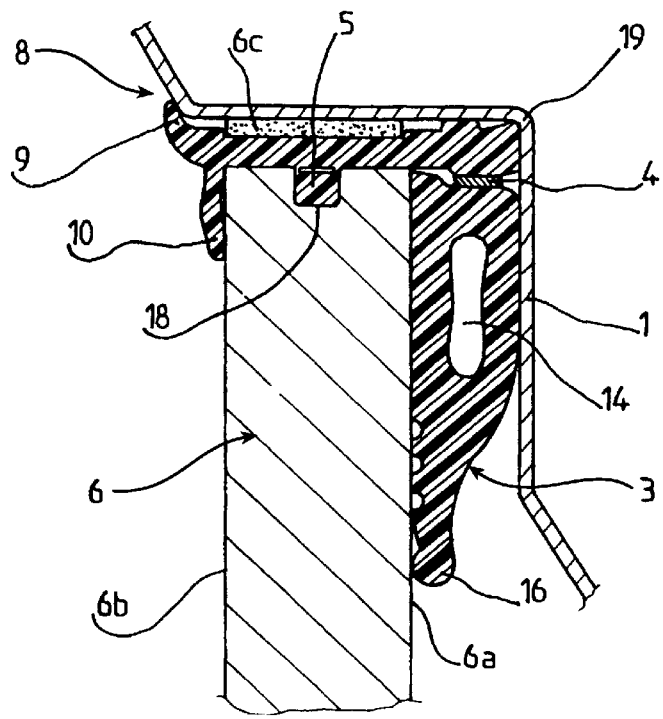
Figure 3:
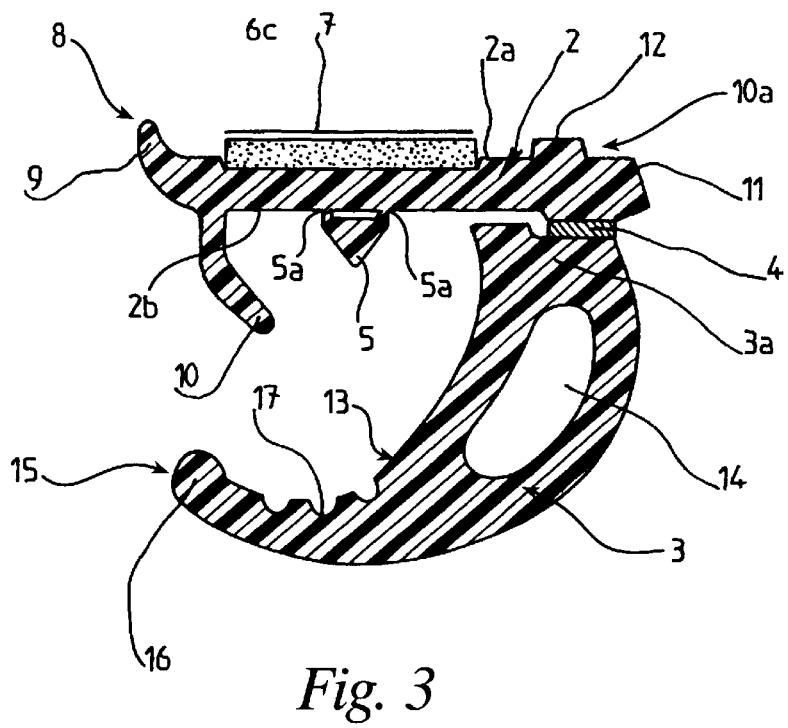
FIG. 3 is a cross-sectional view of another embodiment of the self-adhesive strip according to the invention in a rest position showing a substantially triangular protrusion.
Figure 4:
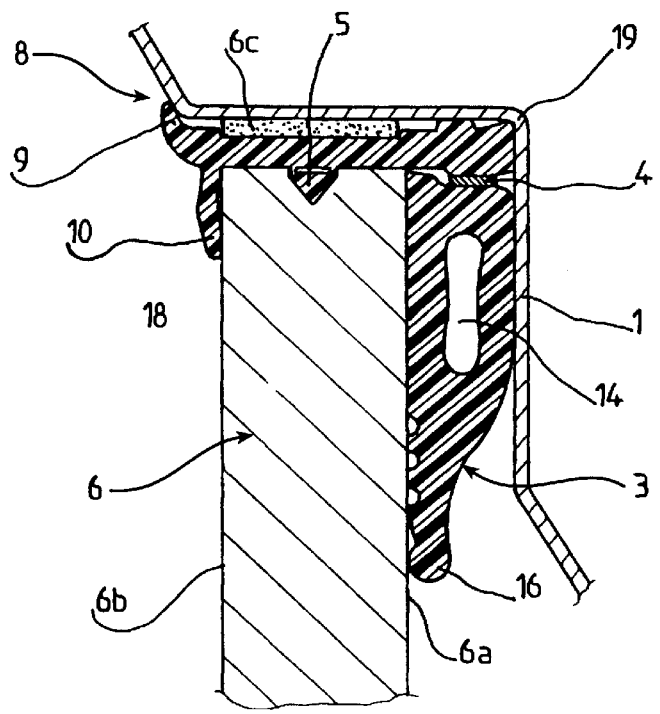
FIG. 4 is a view similar to FIG. 3 but showing the strip during its mounting and fixation to an automobile.

One of the wings or a first wing 2 comprises an outer self-adhesive face 2a and, on its opposite face 2b, a protrusion 5 in the shape of a rail for providing a guiding of the joint by means of a tool 6 (FIG. 2). The tool is used for affixing the strip by pressure and gluing, as will be shown later in detail.

The outer face 2a of the first arm 2 comprises an adhesive coating Ec which, as better shown in FIG. 2, is housed in said face and is covered with a removable protecting tape 7.

The rail shaped protrusion 5 which protrudes on the opposed face 2b of the wing 2 of the strip comes from molding therewith and may be removable (or not) by tearing away after fixation of the strip in the recess 1. According to the example of the embodiment shown in FIG. 1, the protrusion 5 has, in a cross-section, a shape which is substantially that of a square and is connected to the wing of the strip by means of small bridges or thinned portions of material 5a. These thinned portions 5a enable to separate the protrusion or rail 5 from the face 2b of the wing 2 after positioning of the strip, as is described later on.

The first wing 2 further comprises a free edge 8 that forms a lip or first lip 9 that is oriented outside of the strip, i.e. on the side of the self-adhesive face 2a, in order to conceal this face. The free end 8 of the arm or wing 2 of the strip also comprises a second lip 10 having a seal tight function and which is extended opposite of the first lip 9, i.e. in front of the second wing 3.

The longitudinal edge 10a of the first wing 2, that is opposed to the free longitudinal edge 8, has one end which is provided with a heel 11 which, as this is better shown in FIG. 1, is extended slightly beyond the hinge 4 that connects the first wing 2 to the second wing 3. The hinge 4 is, therefore, recessed from the heel 11. This heel 11 advantageously enables to adjust the positioning of the strip in the recess 1 when the joint is manually positioned. There is still shown at 12 a small protrusion that protrudes from the face 2a of the wing 2 and forms a bearing abutment of the strip within the recess 1.

The second wing 3 comprises a longitudinal cavity 14 designed to improve the radius engagement, which means to facilitate a deformation of the joint in the rounded portions of the recess 1, and is ended by a free edge 15 that forms a lip 16 able to provide seal tightness by contacting the lip 10 upon a closing of the door (such a door is not shown in the drawings).

Inner longitudinal notches have been shown at 17 and are made in the second wing 3 between the cavity 14 and the lip 16 for providing some flexibility to deflection of the lip 16 in order to facilitate closing of the door. Actually, upon closing, the latter comes into contact with the free end of the wing 3 and pushes it until it is in contact with the lip 10.

Positioning and fixation of the self-adhesive strip which has just been described will now be briefly explained by referring more particularly to FIG. 2.

According to the example as shown, the tool 6 for positioning and fixing by pressure and gluing the strip within the recess 1 is a knurling tool, a roller or similar, which is rotatively driven by any suitable means (not shown). The tool comprises, on the periphery thereof, a groove 18 having, in cross-section, a shape corresponding to that of the rail 5. Therefore, the self-adhesive strip will be able to be precisely positioned within the recess 1 by means of the roller 6 maintaining said strip. It will be shown here that the arcuate wing 3 that is articulated on the wing 2 by means of the hinge 4, will be somehow spaced from said wing 2 for bearing on one 6a of the roller faces, while the second lip 10 of the first wing will bear on the other face 6b of the roller 6.

Obviously, the protective tape 7 will be removed before pressure applying the strip within the recess 1, and this is made by rolling the roller 6 cooperating with the rail shaped protrusion 5. The positioning accuracy of the self-adhesive strip within the recess 1 will be improved, in a manual mode of operation, by the heel 11 that cooperates with the corner 19 of the recess 1.

It will be clear from the preceding disclosure that, after all, the strip will be fixed by means of the adhesive coating 6c on the recess 1 because roller 6 applies sufficient pressure to the strip during rolling operation. Thereafter, the roller 6 is withdrawn and the wing 3, articulated with respect to the wing 2, will take again its arcuate position as shown in FIG. 1.

Lastly, the rail shaped protrusion 5 will, according to the embodiment as shown, be removed by tearing from the face 2b of the wing 2 of the strip, which will facilitate an adaptation of the strip to possible alternative mounting operations.

It will be noted here that, if in the example as above described, the positioning and fixation of the strip are made by means of a rotatively driven roller, it is possible to use other tools, for example a roller which will not be rotatively driven, or a tool such as a smoothing iron having a notch of a shape conjugate to that of the rail 5.

There has thus been made according to the invention a self-adhesive strip which will be, on all the length thereof, well positioned and fixed by gluing within, for example, a recess, without risking an un-gluing, even after a long time. The present invention helps to ensure a protecting and tight seal along the length of the seal.

Obviously, the invention is not limited to the embodiment as described and shown, and which has only been given as an example.

It is thus possible to provide a protrusion which may be either torn out or not on the wing 2 of the strip. Samely, this protrusion could have, in a cross-section, any shape according to the shape of the tool that receives this protrusion for the guiding and fixation of the strip.

It is thus obvious that the invention comprises all technical equivalents of the hereinabove described means, as well as the combinations thereof if they are made according to the scope of the invention as defined by the following claims.

What is claimed is:

1. A self adhesive strip for forming a joint for an automobile vehicle, comprising a first self-adhesive face (2a), a second face (2b) that is opposed to the first self adhesive face (2a), and a rail shaped protrusion (5) formed on the second face at a location opposite to said first face, said rail shaped protrusion configured and dimensioned to engage a corresponding recess of a tool for enabling guiding thereof by the tool (6) for fixation of the strip by pressure.

2. The strip as set forth in claim 1, wherein said rail shaped protrusion (5) has a cross-sectional shape enabling a guiding thereof, said shape being one of a triangle, a rectangle or a square, said protrusion configured and dimensioned for cooperating with a tool (6) having a groove (18) or a notch of a shape corresponding to said protrusion.

3. A self adhesive strip for forming a joint for an automobile vehicle, comprising a first self-adhesive face (2a), a second face (2b) that is opposed to the first self adhesive face (2a), and a rail shaped protrusion (5) formed on the second face at a location opposite to said first face, said rail shaped protrusion configured and dimensioned to engage a corresponding recess of a tool for enabling guiding thereof by the tool (6) for fixation of the strip by pressure, the strip
  further comprising two wings (2, 3) articulated together by one of their two longitudinal edges, the first wing (2) comprising the first self-adhesive face (2a) and the second face (2b) including the protrusion which protrudes in the direction toward the second wing (3).

4. The strip as set forth in claim 3, wherein said second wing (3) comprises a cavity (14) and a free edge (15) in a shape of a lip (16).

5. The strip as set forth in claim 3, wherein said self-adhesive face (2a) of said first wing (2) comprises an adhesive coating (6) that is housed in said self-adhesive face and covered with a removable protective tape (7).

6. A self adhesive strip for forming a joint for an automobile vehicle, comprising a first self-adhesive face (2a), a second face (2b) that is opposed to the first self adhesive face (2a), and a rail shaped protrusion (5) formed on the second face for enabling guiding thereof by the tool (6) for causing a fixation of the strip by pressure;
  wherein two wings (2, 3) are articulated together by one of their two longitudinal edges, the first wing (2) comprising the first self-adhesive face (2a) and the second face (2b) including the protrusion which protrudes in the direction toward the second wing (3); and
  wherein said rail shaped protrusion (5) is integral with said first wing (2) by means of at least one thinned portion of material (5a) permitting to separate said protrusion from said first wing after positioning of said strip.

7. A self adhesive strip for forming a joint for an automobile vehicle, comprising a first self-adhesive face (2a), a second face (2b) that is opposed to the first self adhesive face (2a), and a rail shaped protrusion (5) formed on the second face for enabling guiding thereof by the tool (6) for causing a fixation of the strip by pressure;
  wherein two wings (2, 3) are articulated together by one of their two longitudinal edges, the first wing (2) comprising the first self-adhesive face (2a) and the second face (2b) including the protrusion which protrudes in the direction toward the second wing (3); and
  wherein said first wing (2) comprises a free edge (8) with a lip (9) that is tilted in a direction away from the second face (2b) and in a direction toward the first face (2a) so as to conceal the first face, and an opposite edge (10a) which comprises a heel (11) and is connected to said second wing (3) by a hinge (4) located at said opposite edge (10a) but recessed from the heel.

8. The strip as set forth in claim 7, wherein said second wing (3) is connected in a substantially orthogonal manner to said second face (2b) of said first wing (2) by means of said hinge (4) and has an arcuate shape with a concavity (13) that is turned in the direction toward said second face (2b) of said first wing (2) that supports said protrusion (5).

9. The strip as set forth in claim 7, wherein said free end (8) of said first wing (2) comprises a second lip (10) which extends in front of said second wing (3), at the opposite of said first lip (9).

10. A self adhesive strip for forming a joint for an automobile vehicle, comprising a first self-adhesive face (2a), a second face (2b) that is opposed to the first self adhesive face (2a), a rail shaped protrusion (5) on the second face having a triangular, rectangular, or square cross-sectional shape and running the length of the strip for enabling guiding of the strip by a tool (6) for applying the strip by pressure, and two wings (2, 3) articulated together by one of their two longitudinal edges, the first wing (2) comprising the first self-adhesive face (2a) and the second face (2b) including the protrusion which protrudes in the direction toward the second wing (3), wherein the first wing (2) comprises a free edge (8) with a lip (9) that is tilted in a direction away from the second face (2b) and in a direction toward the first face (2a) so as to conceal the first face, and an opposite edge (10a) which comprises a heel (11) and is connected to the second wing (3) by a hinge (4) located at the opposite edge (10a) but recessed from the heel.

11. A self adhesive strip and tool for forming a joint for an automobile vehicle, the strip comprising a first self-adhesive face (2a), a second face (2b) that is opposed to said first self-adhesive face (2a), a rail shaped protrusion (5) formed on said second face for enabling guiding of the strip by the tool (6) for causing a fixation of the strip by pressure, wherein the rail shaped protrusion (5) has at least one of a triangular, rectangular, or square cross-sectional shape for association with the tool, and the tool has a groove (18) that has a shape that corresponds to the shape of the protrusion (5) of the strip.

12. A self-adhesive strip for forming a joint for an automobile vehicle, comprising:
  a first self-adhesive face (2a),
  a second face (2b) that is opposed to the first self-adhesive face (2a), and
  a rail-shaped protrusion (5) formed on the second face at a location opposite said first face,
  said rail shaped protrusion configured and dimensioned to engage a corresponding recess of a tool for enabling guiding thereof by the tool (6) for fixation of the strip by pressure, and wherein two wings (2,3) are articulated together by one of their two longitudinal edges, the first wing (2) comprising the first self-adhesive face (2a) and the second face (2b) including the protrusion which protrudes in the direction toward the second wing (3).

13. A self-adhesive strip for forming a joint for an automobile vehicle, comprising:
  a first self-adhesive face (2a),
  a second face (2b) that is opposed to the first self-adhesive face (2a), and
  a rail-shaped protrusion (5) formed approximately at a middle portion of the second face, and at a location opposite said first face,
  said rail shaped protrusion configured and dimensioned to engage a corresponding recess of a tool for enabling guiding thereof by the tool (6) for fixation of the strip by pressure, and wherein two wings (2,3) are articulated together by one of their two longitudinal edges, the first wing (2) comprising the first self-adhesive face (2a) and the second face (2b) including the protrusion which protrudes in the direction toward the second wing (3).

14. A self-adhesive strip for forming a joint for an automobile vehicle, comprising:

a first wing having:
   a first longitudinal edge;
   a first face provided with an adhesive coating, and
   a second face provided with a rail-shaped protrusion located at a central portion thereof with the adhesive coating at least partially overlapping the rail-shaped protrusion, the second face facing in a direction opposite to a direction faced by the first face and being separated therefrom by a thickness of the first wing; and
a second wing having a first end connected to the first wing along the first longitudinal edge of the first wing
wherein the second wing is deformable between a first position in which the second wing at least partially overlaps the rail-shaped protrusion, and a second position in which second wing does not overlap the rail-shaped portion, in a cross-sectional view of the self-adhesive strip.

15. The self-adhesive strip according to claim 14, wherein the second wing has a second end which terminates in a first lip;

the second face is provided with a second lip which extends therefrom; and the first and second lips are deformable between respective first positions in which the first and second lips overlap, and respective second positions in which the first and second lips do not overlap, in a cross-sectional view of the self-adhesive strip.

16. The self-adhesive strip according to claim 15, wherein the first and second wings are connected via a hinge.

17. A self-adhesive strip for forming a joint for an automobile vehicle, comprising:

a first self-adhesive face (2a), a second face (2b) that is opposed to the first self-adhesive face (2a), and a rail-shaped protrusion (5) formed approximately at a middle portion of the second face, and at a location opposite said first face, said rail shaped protrusion configured and dimensioned to engage a corresponding recess of a tool for enabling guiding thereof by the tool (6) for fixation of the strip by pressure.

* * * * *